(12) United States Patent
Nie et al.

(10) Patent No.: US 10,949,991 B2
(45) Date of Patent: Mar. 16, 2021

(54) METHOD AND APPARATUS FOR DETERMINING POSITION OF PUPIL

(71) Applicant: BEIJING 7INVENSUN TECHNOLOGY CO., LTD., Beijing (CN)

(72) Inventors: Fengmei Nie, Beijing (CN); Wei Liu, Beijing (CN); Dongchun Ren, Beijing (CN); Jian Wang, Beijing (CN); Meng Yang, Beijing (CN); Xiaohu Gong, Beijing (CN)

(73) Assignee: Beijing 7Invensun Technology Co., Ltd., Beijing (CN)

( * ) Notice: Subject to any disclaimer, the term of this patent is extended or adjusted under 35 U.S.C. 154(b) by 59 days.

(21) Appl. No.: 16/349,799

(22) PCT Filed: Dec. 7, 2018

(86) PCT No.: PCT/CN2018/119882
§ 371 (c)(1),
(2) Date: May 14, 2019

(87) PCT Pub. No.: WO2019/144710
PCT Pub. Date: Aug. 1, 2019

(65) Prior Publication Data
US 2020/0273198 A1 Aug. 27, 2020

(30) Foreign Application Priority Data

Jan. 23, 2018 (CN) .......................... 201810064311.2

(51) Int. Cl.
G06T 7/70 (2017.01)
G06T 7/66 (2017.01)
(Continued)

(52) U.S. Cl.
CPC ............ *G06T 7/70* (2017.01); *G06K 9/00597* (2013.01); *G06K 9/6256* (2013.01);
(Continued)

(58) Field of Classification Search
CPC ............ G06T 2207/30201; G06T 7/70; G06T 2207/30041; G06T 5/50; G06T 7/73;
(Continued)

(56) References Cited

U.S. PATENT DOCUMENTS 8,556,424 B2 * 10/2013 Iwase .................... A61B 3/1225
351/206
8,824,779 B1 * 9/2014 Smyth ..................... G06T 7/593
382/154

(Continued)

FOREIGN PATENT DOCUMENTS

CN 102129553 A 7/2011
CN 103425970 A 12/2013
(Continued)

OTHER PUBLICATIONS

International Search Report for Application No. PCT/CN2018/119882 dated Mar. 8, 2019.
(Continued)

*Primary Examiner* — Ajibola A Akinyemi
(74) *Attorney, Agent, or Firm* — Jenkins Wilson Taylor & Hunt, PA

(57) ABSTRACT

Disclosed is a method and apparatus for determining a position of a pupil. The method includes: acquiring an image to be detected including a pupil; acquiring a binary image of a preset area based on a preset model of semi-supervised learning, where the preset area is an area where the pupil is located in the image to be detected; acquiring a centroid of the binary image; and determining a central position of the pupil according to the centroid of the binary image.

16 Claims, 5 Drawing Sheets

(51) Int. Cl.
*G06K 9/00* (2006.01)
*G06K 9/62* (2006.01)
*G06N 3/04* (2006.01)
*G06N 3/08* (2006.01)

(52) U.S. Cl.
CPC ............ *G06N 3/0454* (2013.01); *G06N 3/088* (2013.01); *G06T 7/66* (2017.01); *G06T 2207/20081* (2013.01); *G06T 2207/20084* (2013.01)

(58) Field of Classification Search
CPC ......... G06T 11/60; G06T 19/006; G06T 7/74; G06T 2207/10012; G06T 2207/10024; G06T 2207/10048; G06T 2207/10052; G06T 5/002; G06T 5/003; G06T 19/00; G06T 2207/10101; G06T 7/11; G06T 2207/10028; G06T 7/246; G06T 2207/10152
USPC .......................................................... 382/103
See application file for complete search history.

(56) References Cited

U.S. PATENT DOCUMENTS

| | | | |
|---|---|---|---|
| 9,025,844 B2* | 5/2015 | Iwase | G06T 7/33 382/131 |
| 9,104,908 B1 | 8/2015 | Rogers et al. | |
| 2003/0128021 A1* | 7/2003 | Tan | G01R 13/029 324/121 E |
| 2008/0033638 A1* | 2/2008 | Hirayama | G01C 21/3638 701/532 |
| 2011/0234785 A1* | 9/2011 | Wanda | A61B 3/12 348/78 |
| 2016/0202757 A1* | 7/2016 | Miao | H04N 5/33 348/78 |

FOREIGN PATENT DOCUMENTS

| | | |
|---|---|---|
| CN | 104732202 A | 6/2015 |
| CN | 105205453 A | 12/2015 |
| CN | 105303185 A | 2/2016 |
| CN | 106845425 A | 6/2017 |
| CN | 107273978 A | 10/2017 |
| CN | 108197594 A | 6/2018 |
| EP | 0467577 A2 | 1/1992 |
| WO | WO 2019/144710 A1 | 8/2019 |

OTHER PUBLICATIONS

Lu Gang, "Disturbed Verification Code Identification Research," Full-text Database of Excellent Masterchar(39)s Degree Thesis in China Information Technology Series, No. S1, pp. 1139-1273, (Dec. 2011).

Chen Qiuxiang, "Research on eye-tracking algorithms based on pupil-corneal reflection," Information Technology Series of Full-text Database of Chinese Excellent Masterchar(39)s Degree Dissertations, No. 01, pp. 1138-1161, (Jan. 2015).

Chinese Office Action for Application No. 201810064311.2 dated Nov. 29, 2019.

Ma et al., "Image Binarization Based on PCNN and corresponding Segmentation Evaluation Method", Journal of South Carolina University of Technology, Natural Science Edition, vol. 37, No. 5, pp. 49-53, (May 2009).

International Preliminary Report on Patentability and Written Opinion for Application No. PCT/CN2018/119882 dated Jul. 28, 2020.

Chinese Office Action for Application No. 201810064311.2 dated Aug. 19, 2020.

* cited by examiner

METHOD AND APPARATUS FOR DETERMINING POSITION OF PUPIL

CROSS-REFERENCE TO RELATED APPLICATIONS

This application is a U.S. national phase application of international patent application No. PCT/CN2018/119882 filed on Dec. 7, 2018, which claims priority to Chinese patent application No. 201810064311.2, entitled "Method and Apparatus for Determining Position of Pupil" and filed on Jan. 23, 2018, the disclosures of each of which are incorporated therein by reference in its entirety.

TECHNICAL FIELD

The present disclosure relates to the field of image processing and, in particular, to a method and apparatus for determining a position of a pupil.

BACKGROUND

The virtual reality (VR) technology is a computer technology capable of creating and experiencing the virtual world, which has wide applications in the field of gaze tracking.

In practical applications, a VR device may perform gaze estimation for a remote device at a gaze point according to a center coordinate of the pupil and conical reflex in an eyeball-based 3D sphere-approximate model. Currently, an unsupervised learning method is adopted for positioning the center of the pupil, that is, the model is trained using unlabeled data. However, the method can only roughly determine the position of the center of the pupil with low accuracy. No effective solution has been provided to solve the problem in the existing art of inaccurate positioning of the central position of the pupil.

SUMMARY

Embodiments of the present disclosure provide a method and apparatus for determining a position of a pupil to solve at least the problem in the existing art of inaccurate positioning of the center of the pupil.

In an aspect, an embodiment of the present disclosure provides a method for determining a position of a pupil. The method includes: acquiring an image to be detected including the pupil; acquiring a binary image of a preset area based on a preset model of semi-supervised learning, where the preset area is an area where the pupil is located in the image to be detected; acquiring a centroid of the binary image; and determining a central position of the pupil according to the centroid of the binary image.

In another aspect, an embodiment of the present disclosure further provides an apparatus for determining a position of a pupil. The apparatus includes a first acquisition module, a second acquisition module, a third acquisition module and a determination module. The first acquisition module is configured to acquire an image to be detected including the pupil. The second acquisition module is configured to acquire a binary image of a preset area based on a preset model of semi-supervised learning, where the preset area is an area where the pupil is located in the image to be detected. The third acquisition module is configured to acquire a centroid of the binary image. The determination module is configured to determine a central position of the pupil according to the centroid of the binary image.

In another aspect, an embodiment of the present disclosure further provides a storage medium. The storage medium includes stored programs which are used to execute the method for determining the position of the pupil.

In another aspect, an embodiment of the present disclosure further provides a processor. The processor is configured to execute programs, which, when executed, execute the method for determining the position of the pupil.

In the embodiments of the present disclosure, by using a semi-supervised learning algorithm, the central position of the pupil is determined according to the centroid of the binary image by acquiring the image to be detected including the pupil, acquiring the binary image corresponding to the preset area base on the preset model of the semi-supervised learning and acquiring the centroid of the binary image, where the preset area is the area where the pupil is located in the image to be detected, thereby achieving a purpose of positioning a pupil center. Since the semi-supervised learning includes two learning processes: unsupervised learning and supervised learning, the preset model obtained by combining the supervised learning and the unsupervised learning avoids inaccurate positioning of the pupil by use of only the unsupervised learning or the supervised learning. In addition, by using the preset model, the image to be detected including the pupil is converted into the binary image with relatively simple processing, and the central position of the pupil may be accurately determined according to the centroid of the binary image, thereby achieving an effect of accurately determining a position of the pupil center and solving the problem in the existing art of inaccurate positioning of the pupil center.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure, and do not limit the present disclosure in any improper way. In the drawings.

DETAILED DESCRIPTION

Figure 1:
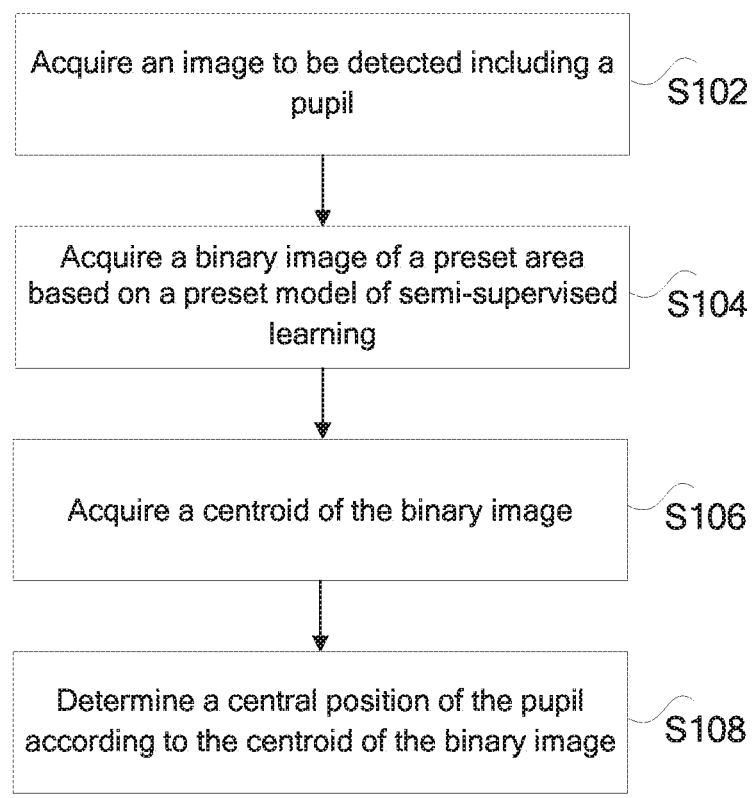
FIG. 1 is a flowchart of a method for determining a position of a pupil according to an embodiment of the present disclosure.

The solutions in embodiments of the present disclosure will be described clearly and completely in conjunction with the drawings in the embodiments of the present disclosure from which the solutions will be apparent to those skilled in the art. The embodiments described below are part, not all, of the embodiments of the present disclosure. Based on the embodiments described herein, other embodiments obtained by those skilled in the art on the premise that no creative work is done are within the scope of the present disclosure.

It is to be noted that the terms "first", "second" and the like in the description, claims and drawings of the present disclosure are used to distinguish between similar objects and are not necessarily used to describe a particular order or sequence. It should be understood that the data used in this way is interchangeable where appropriate so that the embodiments of the present disclosure described herein may also be implemented in a sequence not illustrated or described herein. In addition, the terms "including", "having" or any other variations thereof described herein are intended to encompass a non-exclusive inclusion. For example, a process, method, system, product or device that includes a series of steps or units may include not only the expressly listed steps or units but also other steps or units that are not expressly listed or are inherent to such a process, method, system, product or device.

Embodiment 1

An embodiment of the present disclosure provides a method for determining a position of a pupil. It is to be noted that the steps illustrated in the flowcharts in the drawings may be performed by a computer system such as a group of computers capable of executing instructions, and although logical sequences are illustrated in the flowcharts, the illustrated or described steps may be performed in sequences different from those described herein in some cases.

FIG. 1 is a flowchart of a method for determining a position of a pupil according to an embodiment of the present disclosure. As shown in FIG. 1, the method includes steps described below.

In step S102, an image to be detected including a pupil is acquired.

It is to be noted that an image capture device may capture an image including the pupil, that is, obtain the image to be detected. One or more images to be detected may be acquired. When a plurality of images to be detected are acquired, the image capture device captures a set of images to be detected including the pupil. In addition, after the image capture device captures the image to be detected, a processor connected to the image capture device may perform processing on the image to be detected to determine a central position of the pupil in the image to be detected.

In step S104, a binary image of a preset area is acquired based on a preset model of semi-supervised learning.

The preset area in this embodiment is an area where the pupil is located in the image to be detected.

It is to be noted that the semi-supervised learning is a machine learning method which combines supervised learning with unsupervised learning. When the semi-supervised learning is adopted to train the preset model, not only the model may be simplified but also a processing result with relatively high accuracy may be obtained. In addition, after the processor obtains the image to be detected, the processor takes the image to be detected as an input of the preset model, performs processing on the image to be detected, and takes an output of the corresponding preset model as the binary image of the area where the pupil is located in the image to be detected.

In addition, it is to be further noted that the binary image refers to an image in which each pixel has only two possible values or gray levels. Since the binary image has the advantages of a small memory, high contrast and the like, in the present application, the image to be detected including multiple gray levels or multiple colors is processed into the binary image with few values and few gray levels, which may improve accuracy of a pupil center with relatively high accuracy and improve a data processing speed.

In addition, if the input of the preset model is the set of images to be detected, the output of the preset model is a set of binary images including a plurality of binary images. Each of the set of binary images corresponds to one of the set of images to be detected.

In step S106, a centroid of the binary image is acquired.

It is to be noted that after the binary image of the image to be detected is obtained, coordinates of pixel points within the area where the pupil is located in the binary image are acquired and then weighted and summed to obtain the centroid of the binary image.

Figure 2:
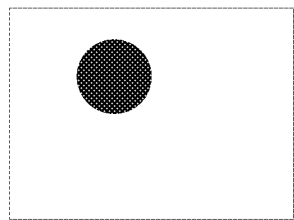
FIG. 2 is a structural diagram of an optional binary image according to an embodiment of the present disclosure.

In an optional embodiment, FIG. 2 is a schematic diagram of an optional binary image. In FIG. 2, a black circle represents the area where the pupil is located in the binary image. As for the binary image, the coordinates of pixel points within the area where the pupil is located can be obtained by finding only coordinates of pixel points with a gray level of 0 in the binary image, and a centroid of the area where the pupil is located in the binary image is obtained by the following formulas:

$$x = \frac{1}{M} \sum_i x_i$$

$$y = \frac{1}{M} \sum_i y_i$$

where M denotes a total number of pixel points in the area where the pupil is located, i denotes a subscript of the pixel point in the area where the pupil is located, $x_i$, $y_i$ denotes the coordinate of an i-th pixel point in the area where the pupil is located and x, y denotes the coordinate of the centroid.

In step S108, the central position of the pupil is determined according to the centroid of the binary image.

It is to be noted that after the centroid of the binary image is obtained, the centroid of the binary image is the central position of the pupil.

As can be seen from the solution defined in steps S102 to S108 described above, the central position of the pupil is determined according to the centroid of the binary image by acquiring the image to be detected including the pupil, acquiring the binary image of the preset area base on the preset model of the semi-supervised learning and acquiring the centroid of the binary image, where the preset area is the area where the pupil is located in the image to be detected.

It is easy to be noted that since the semi-supervised learning includes two learning processes: the unsupervised learning and the supervised learning, the preset model obtained by combining the supervised learning and the unsupervised learning may overcome the problem in the existing art of inaccurate positioning of the pupil by use of only the unsupervised learning or the supervised learning. In addition, by using the preset model, the image to be detected including the pupil is converted into the binary image with relatively simple processing, and the central position of the pupil may be accurately determined according to the centroid of the binary image. In addition, the preceding simple calculation process increases a speed at which the pupil center is accurately positioned.

It may be known from the above description that the embodiment of the present application may achieve a purpose of positioning the center of the pupil, thereby achieving an effect of accurately determining a position of the center of the pupil and solving the problem in the existing art of inaccurate positioning of the center of the pupil.

It is to be noted that before the binary image of the preset area is acquired based on the preset model of the semi-supervised learning, the preset model needs to be constructed and the specific steps are described below.

In step S10, a first-type training set and a second-type training set are acquired. Both the first-type training set and the second-type training set include one or more original images to be trained.

In step S12, a network model is acquired. The network model is configured to convert each of the original images to be trained into the binary image.

In step S14, a loss function of the network model is constructed.

In step S16, the preset model is constructed according to the first-type training set, the second-type training set and the loss function of the network model.

Figure 3A:
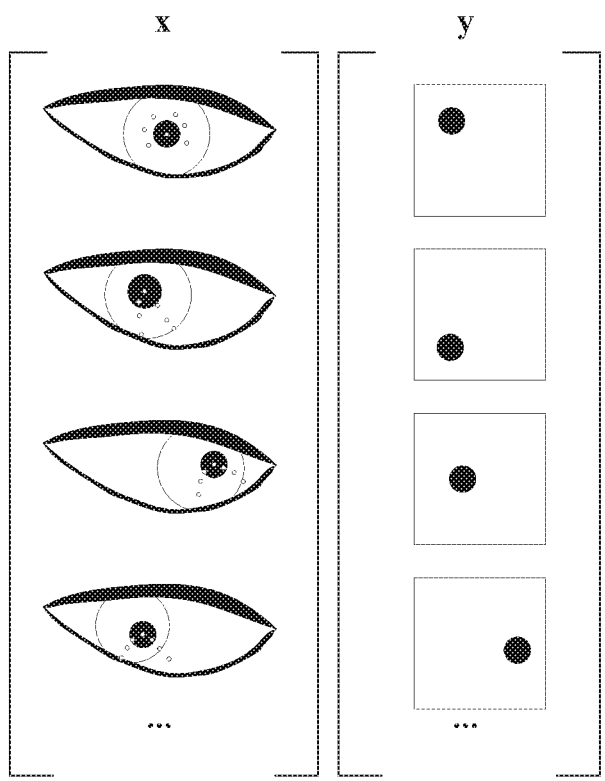
FIG. 3(a) is a schematic diagram of an optional unlabeled training set according to an embodiment of the present disclosure.
Figure 3B:
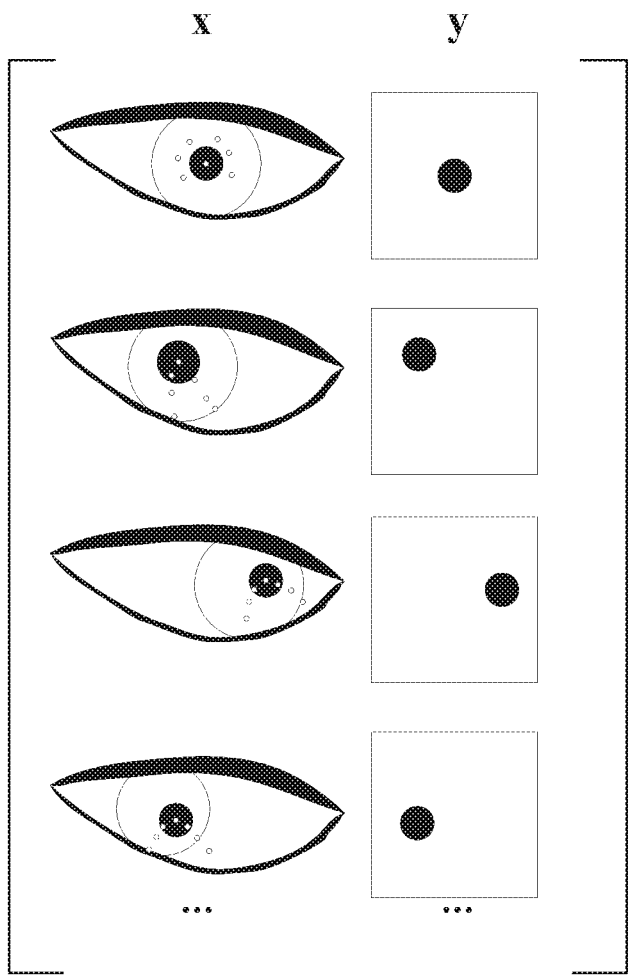
FIG. 3(b) is a schematic diagram of an optional labeled training set according to an embodiment of the present disclosure.

It is to be noted that a plurality of images to be trained constitute a set of images to be trained and the set of images to be trained includes the first-type training set and the second-type training set. The first-type training set is an unlabeled training set, that is, the original image has no correspondence with the binary image. FIG. 3(a) is a schematic diagram of an optional unlabeled training set. The second-type training set is a labeled training set, that is, the original image has a one-to-one correspondence with the binary image. FIG. 3(b) is a schematic diagram of an optional labeled training set. In FIG. 3(a) and FIG. 3(b), x represents the original image and y represents the binary image.

In addition, it is to be noted that the network model described above is generative adversarial networks (GAN), which may include two GANs. One GAN is configured to convert the original image into the binary image and the other GAN is configured to convert the binary image into the original image. After the network model is obtained, the loss function of the network model may be constructed based on the network model and the specific steps are described below.

In step S140, a hyper-parameter of the network model is acquired.

In step S142, when the unsupervised learning is performed on the network model, the loss function of the network model is determined as a first loss function and a second loss function based on the hyper-parameter.

In step S144, when the supervised learning is performed on the network model, the loss function of the network model is determined as a third loss function and a fourth loss function based on the hyper-parameter.

It is to be noted that the hyper-parameter of the network model refers to a parameter of a set value before a learning process is started in a context of the machine learning. In the present application, the hyper-parameter of the network model includes at least at least one of: a learning rate, a ratio of unsupervised learning to supervised learning, a total number of batching images and a total number of training rounds of the network model.

Optionally, when the unsupervised learning is performed on the network model, the first loss function is a loss function of a generator and the second loss function is a loss function of a discriminator. The first loss function is written as:

$$l_g = \lambda_Y \|y - G_A(G_B(y))\| + \lambda_X \|x - G_B(G_A(x))\| - D_B(G_B(y)) - D_A(G_A(x))$$

The second loss function is written as:

$$l_{DA} = D_A(G_A(x)) - D_A(y)$$

$$l_{DB} = D_B(G_B(x)) - D_B(y)$$

When the supervised learning is performed on the network model, the third loss function is the loss function of the generator and the fourth loss function is the loss function of the discriminator. The fourth loss function is the same as the second loss function, that is, an update manner of the discriminator does not change no matter in the supervised learning or in the unsupervised learning. Therefore, the third loss function is written as:

$$l_g = \lambda_Y \|y - G_A(x)\| + \lambda_X \|x - G_B(y)\| - D_B(G_B(y)) - D_A(G_A(x))$$

In the above formula, $\lambda_Y$ and $\lambda_X$ denote the hyper-parameter and may be determined empirically; $G_A$ represents generator A, $G_B$ represents generator B, $D_B$ represents discriminator B and $D_A$ represents discriminator A. X and Y respectively represent an original image domain and a binary image domain, and x and y respectively represent an image in an X domain and an image in a Y domain.

It is to be noted that after the network model, the first-type training set and the second-type training set are obtained, the preset model may be constructed, that is, the loss function of the preset model is constructed, and a specific method includes steps described below.

In step S160, a parameter of the discriminator and a parameter of the generator of the network model are updated based on the first-type training set and the second-type training set to obtain an updated network model.

In step S162, the preset model is constructed according to the updated network model when update times of the network mode reaches a first threshold.

Optionally, the step in which the parameter of the discriminator and the parameter of the generator of the network model are updated based on the first-type training set and the second-type training set to obtain the updated network model includes steps described below.

In step S1602, based on the first-type training set, the parameter of the discriminator is updated according to the second loss function.

In step S1604, based on the first-type training set, the parameter of the generator is updated according to the first loss function.

In step S1606, when update times of the parameter of the discriminator and the parameter of the generator reach a second threshold, based on the second-type training set, the parameter of the generator is updated according to the third loss function.

In step S1608, based on the second-type training set, the parameter of the discriminator is updated according to the fourth loss function.

When the update times of the parameter of the discriminator and the parameter of the generator reaches a third threshold, the update times of the network model is increased by 1 until the update times of the network model reaches the first threshold.

It is to be noted that the first threshold is a maximum number of update times for training the network model and the second threshold is a maximum number of update times for updating the parameter of the generator (the parameter of the generator in an unsupervised learning manner) and the parameters of the discriminator (the parameter of the discriminator in the unsupervised learning manner) in the unsupervised learning manner, and the third threshold is a maximum number of update times for updating the parameter of the generator (the parameter of the generator in a supervised learning manner) and the parameters of the discriminator (the parameter of the discriminator in the supervised learning manner) in the supervised learning manner.

Figure 4:
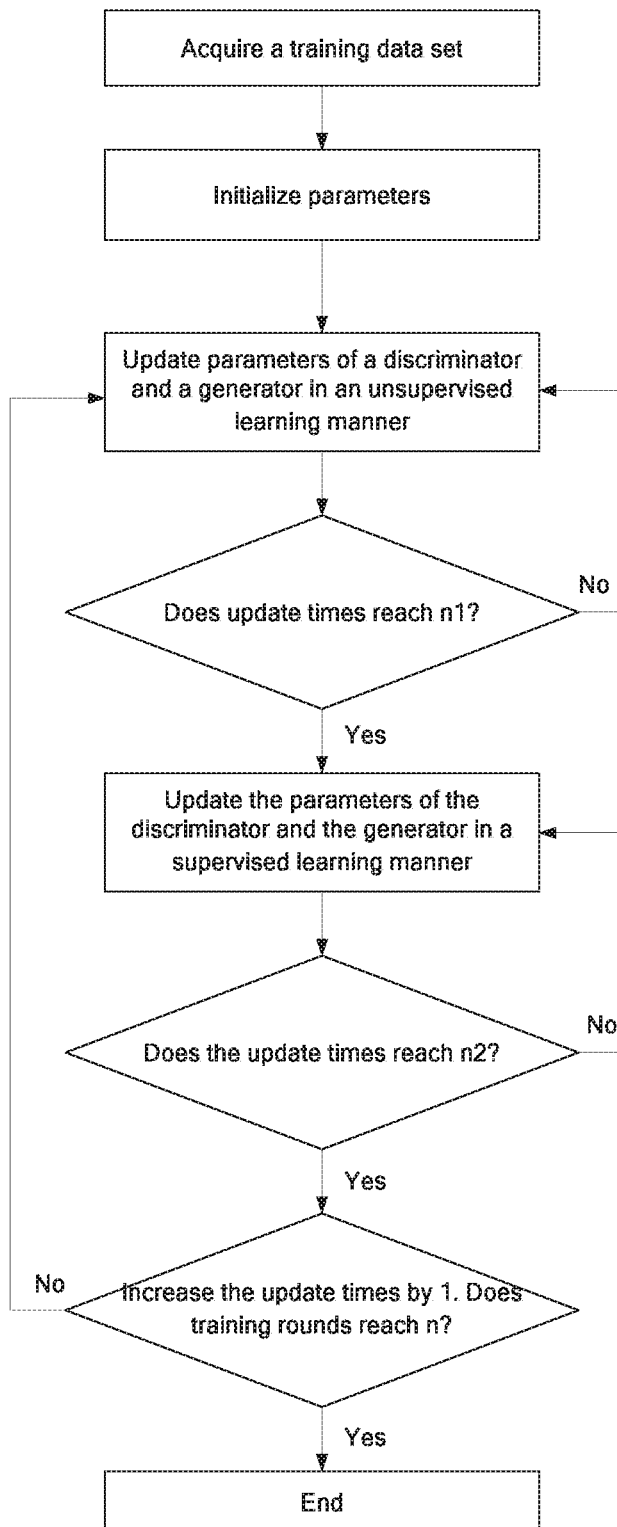
FIG. 4 is a flowchart illustrating construction of an optional preset model according to an embodiment of the present disclosure.

In an optional embodiment, FIG. 4 is a flowchart illustrating construction of an optional preset model. In FIG. 4, the first threshold is n, the second threshold is n1, and the third threshold is n2. Optionally, after a training data set is acquired, that is, after the first-type training set and the second-type training set are acquired, parameters of the network model are initialized, which specifically includes initialization of a weight parameter and the hyper-parameter of the network model. After the parameters are initialized, the parameter of the generator and the parameter of the discriminator are updated in the unsupervised learning manner by using the unlabeled training set (the first-type training set) and a gradient descent method; when the update times of the parameter of the generator and the parameter of the discriminator reaches the second threshold (n1), the update is performed in the supervised learning manner, that is, the parameter of the generator and the parameter of the discriminator are updated in the supervised learning manner by using the labeled training set (the second-type training set) and the gradient descent method. When the update times of the parameter of the generator and the parameter of the discriminator reaches the third threshold (n2), the network model is updated once and the training of the network model is stopped. When the update times of the parameter of the generator and the parameter of the discriminator reaches the first threshold, the preset model is constructed by the obtained generator and the discriminator.

Embodiment 2

Figure 5:
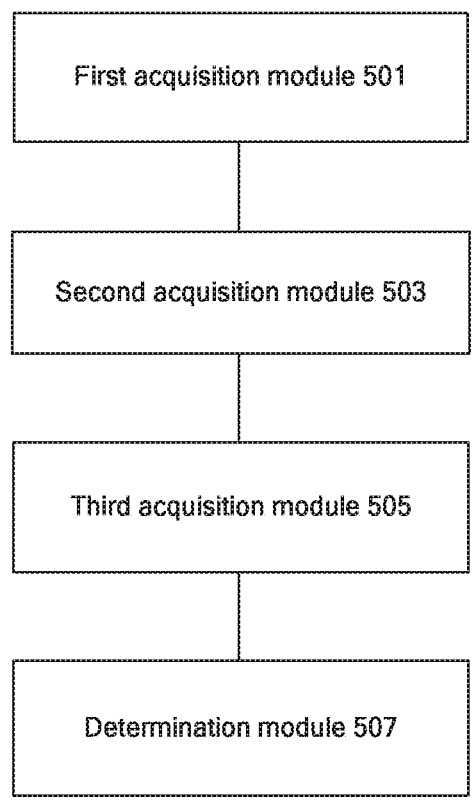
FIG. 5 is a structural diagram of an apparatus for determining a position of a pupil according to an embodiment of the present disclosure.

An embodiment of the present disclosure further provides an apparatus for determining a position of a pupil. The apparatus for determining the position of the pupil includes one or more processors and one or more memories for storing a program unit. The program unit is executed by the processors and the program unit includes a first acquisition module, a second acquisition module, a third acquisition module and a determination module. FIG. 5 is a structural diagram of an apparatus for determining a position of a pupil according to an embodiment of the present disclosure. As shown in FIG. 5, the apparatus includes a first acquisition module 501, a second acquisition module 503, a third acquisition module 505 and a determination module 507.

The first acquisition module 501 is configured to acquire an image to be detected including a pupil. The second acquisition module 503 is configured to acquire a binary image of a preset area based on a preset model of semi-supervised learning, where the preset area is an area where the pupil is located in the image to be detected. The third acquisition module 505 is configured to acquire a centroid of the binary image. The determination module 507 is configured to determine a central position of the pupil according to the centroid of the binary image.

It is to be noted that the first acquisition module 501, the second acquisition module 503, the third acquisition module 505 and the determination module 507 correspond to steps S102 to S108 in embodiment 1, and the four modules have the same examples and application scenarios in which the corresponding steps are implemented, but are not limited to what has been disclosed in embodiment 1.

It is to be noted that the first acquisition module 501, the second acquisition module 503, the third acquisition module 505 and the determination module 507 may be executed in a terminal as part of the apparatus and the functions of the four modules may be implemented by a processor in the terminal. The terminal may also be a terminal device such as a smart phone (such as an Android phone, an iOS phones), a tablet computer, a handheld computer, a mobile Internet devices (MIDs) and a PAD.

In an optional embodiment, the apparatus for determining the position of the pupil further includes a fifth acquisition module, a sixth acquisition module, a first construction module and a second construction module. The fifth acquisition module is configured to acquire a first-type training set and a second-type training set. Both the first-type training set and the second-type training set include one or more original images to be trained and a plurality of images to be trained include the first-type training set and the second-type training set. The sixth acquisition module is configured to acquire a network model. The network model is configured to convert each of the original images to be trained into the binary image. The first construction module is configured to construct a loss function of the network model. The second construction module is configured to construct the preset model according to the first-type training set, the second-type training set and the loss function of the network model.

It is to be noted that the fifth acquisition module, the sixth acquisition module, the first construction module and the second construction module correspond to steps S10 to S16 in embodiment 1, and the four modules have the same examples and application scenarios in which the corresponding steps are implemented, but are not limited to what has been disclosed in embodiment 1.

It is to be noted that the fifth acquisition module, the sixth acquisition module, the first construction module and the second construction module may be executed in the terminal as part of the apparatus and the functions of the four modules may be implemented by the processor in the terminal.

In an optional embodiment, the first construction module includes a seventh acquisition module, a first determination module and a second determination module. The seventh acquisition module is configured to acquire a hyper-parameter of the network model. The first determination module is configured to determine the loss function of the network model as a first loss function and a second loss function based on the hyper-parameter when unsupervised learning is performed on the network model. The second determination module is configured to determine the loss function of the network model as a third loss function and a fourth loss function based on the hyper-parameter when supervised learning is performed on the network model.

It is to be noted that the seventh acquisition module, the first determination module and the second determination module correspond to steps S140 to S144 in embodiment 1, and the three modules have the same examples and application scenarios in which the corresponding steps are implemented, but are not limited to what has been disclosed in the embodiment 1.

It is to be noted that the seventh acquisition module, the first determination module and the second determination module may be executed in the terminal as part of the apparatus and the functions of the three modules may be implemented by the processor in the terminal.

In an optional embodiment, the second construction module includes a first update module and a third construction module. The first update module is configured to update a parameter of a discriminator and a parameter of a generator of the network model based on the first-type training set and the second-type training set to obtain an updated network model. The third construction module is configured to construct the preset model according to the updated network model when update times of the network mode reaches a first threshold.

It is to be noted that the first update module and the third construction module correspond to steps S160 to S162 in embodiment 1, and such two modules have the same examples and application scenarios in which the corresponding steps are implemented, but are not limited to what has been disclosed in embodiment 1.

It is to be noted that the first update module and the third construction module may be executed in the terminal as part of the apparatus and the functions of the two modules may be implemented by the processor in the terminal.

In an optional embodiment, the first update module includes a second update module, a third update module, a fourth update module and a fifth update module. The second update module is configured to update, based on the first-type training set, the parameter of the discriminator according to the second loss function. The third update module is configured to update, based on the first-type training set, the parameter of the generator according to the first loss function. The fourth update module is configured to update, based on the second-type training set, the parameter of the generator according to the third loss function when update times of the parameter of the discriminator and the parameter of the generator reaches a second threshold. The fifth update module is configured to update, based on the second-type training set, the parameter of the discriminator according to the fourth loss function. When the update times of the parameter of the discriminator and the parameter of the generator reaches a third threshold, the update times of the network model is increased by 1 until the update times of the network model reaches the first threshold.

It is to be noted that the second update module, the third update module, the fourth update module and the fifth update module correspond to steps S1602 to S1608 in embodiment 1, and such four modules have the same examples and application scenarios in which the corresponding steps are implemented, but are not limited to what has been disclosed in embodiment 1.

It is to be noted that the second update module, the third update module, the fourth update module and the fifth update module may be executed in the terminal as part of the apparatus and the functions of such four modules may be implemented by the processor in the terminal.

Embodiment 3

In another aspect, an embodiment of the present disclosure further provides a storage medium. The storage medium includes stored programs that are used for executing the method for determining the position of the pupil in embodiment 1.

The various functional modules provided by the embodiments of the present application may be executed in an apparatus for determining a position of a pupil or a similar computing apparatus, and may also perform storage as part of the storage medium.

Optionally, in this embodiment, the storage medium described above is configured to store computer programs, which, when executed, are used for executing a data processing method.

Optionally, in this embodiment, the storage medium is configured to store program codes for executing the following steps: acquiring an image to be detected including a pupil; acquiring a binary image of a preset area based on a preset model of semi-supervised learning, where the preset area is an area where the pupil is located in the image to be detected; acquiring a centroid of the binary image; and determining a central position of the pupil according to the centroid of the binary image.

Optionally, in this embodiment, the storage medium may be further configured to store program codes for executing the steps of the various preferred or optional methods provided by the method for determining the position of the pupil.

Embodiment 4

In another aspect, an embodiment of the present disclosure further provides a processor. The processor is configured to execute programs, which, when executed, are used for executing the method for determining the position of the pupil provided in embodiment 1.

In this embodiment, the processor may execute the programs of the method for determining the position of the pupil.

Optionally, in this embodiment, the processor may be configured to execute the following steps: acquiring an image to be detected including a pupil; acquiring a binary image of a preset area based on a preset model of semi-supervised learning, where the preset area is an area where the pupil is located in the image to be detected; acquiring a centroid of the binary image; and determining a central position of the pupil according to the centroid of the binary image.

The processor may execute the software programs and modules stored in a memory to implement various functional applications and data processing, that is, to implement the method for determining the position of the pupil described above.

It may be understood by those skilled in the art that all or part of the steps in the various methods in the embodiments described above may be implemented by related hardware of an apparatus for determining a position of a pupil according to an indication of the programs which may be stored in a readable storage medium of the apparatus for determining the position of the pupil. The storage medium may include a flash disk, a rad-only memory (ROM), a random access memory (RAM), a magnetic disk, an optical disk or the like.

The method and apparatus for determining the position of the pupil according to the present disclosure are described by way of examples with reference to the drawings. However, it should be understood by those skilled in the art that for the method and apparatus for determining the position of the pupil provided by the present disclosure, various improvements may also be made without departing from the content of the present disclosure. Therefore, the scope of protection of the present disclosure is determined by the appended claims.

The serial numbers of the embodiments described above of the present disclosure are merely for ease of description and do not indicate superiority and inferiority of the embodiments.

In the embodiments described above of the present disclosure, the description of each embodiment has its own emphasis. For a part not described in detail in one embodiment, reference may be made to a related description of another embodiment.

It should be understood that the technical content disclosed in the embodiments of the present application may be implemented in other ways. The apparatus embodiment described above is merely exemplary. For example, the unit classification may be a logical function classification, and, in practice, the unit classification may be implemented in other ways. For example, multiple units or components may be combined or may be integrated into another system, or some features may be omitted or not executed. Additionally, the presented or discussed mutual coupling, direct coupling or communication connections may be indirect coupling or communication connections via interfaces, units or modules, or may be electrical or in other forms.

The units described above as separate components may or may not be physically separated. Components presented as units may or may not be physical units, i.e., may be located in one place or may be distributed on multiple units. Part or all of these units may be selected according to practical requirements to achieve objects of the solutions in the embodiments of the present disclosure.

Additionally, various functional units in each embodiment of the present disclosure may be integrated into one processing unit, or each unit may be physically present separately, or two or more units may be integrated into one unit. The integrated unit may be implemented by hardware or a software functional unit.

The integrated unit may be stored in a computer-readable storage medium if implemented in the form of a software functional unit and sold or used as an independent product. Based on this understanding, solutions provided by the present disclosure substantially, or the part contributing to the existing art, may be embodied in the form of a software product. The software product is stored on a storage medium and includes several instructions for enabling a computer device (which may be a personal computer, a server or a network device) to execute all or part of the steps in the method provided by each embodiment of the present disclosure. The preceding storage medium includes: a USB flash drive, a read-only memory (ROM), a random access memory (RAM), a mobile hard disk, a magnetic disk, an optical disk or another medium capable of storing program codes.

The above are merely preferred implementation nodes of the present disclosure. It is to be noted that for those skilled in the art, a number of improvements and modifications can be made without departing from the principle of the present disclosure, and these improvements and modifications are within the scope of the present disclosure.

What is claimed is:

1. A method for determining a position of a pupil, comprising:
    acquiring an image to be detected comprising the pupil;
    acquiring a binary image of a preset area based on a preset model of semi-supervised learning, wherein the preset area is an area where the pupil is located in the image to be detected;
    acquiring a centroid of the binary image;
    determining a central position of the pupil according to the centroid of the binary image;
    wherein before the acquiring a binary image of a preset area based on a preset model of semi-supervised learning, the method further comprises:
    acquiring a first-type training set and a second-type training set, wherein the first-type training set and the second-type training set each comprises at least one original image to be trained;
    acquiring a network model, wherein the network model is configured to convert the at least one original image to be trained into the binary image;
    constructing a loss function of the network model; and
    constructing the preset model according to the first-type training set, the second-type training set and the loss function of the network model.

2. The method of claim 1, wherein the constructing a loss function of the network model comprises:
    acquiring a hyper-parameter of the network model;
    in response to performing unsupervised learning on the network model, determining the loss function of the network model as a first loss function and a second loss function based on the hyper-parameter; and
    in response to performing supervised learning on the network model, determining the loss function of the network model as a third loss function and a fourth loss function based on the hyper-parameter.

3. The method of claim 1, wherein the constructing the preset model according to the first-type training set, the second-type training set and the loss function of the network model comprises:
    updating a parameter of a discriminator of the network model and a parameter of a generator of the network model based on the first-type training set and the second-type training set to obtain an updated network model; and
    constructing the preset model according to the updated network model when update times of the network mode reaches a first threshold.

4. The method of claim 3, wherein the updating a parameter of a discriminator of the network model and a parameter of a generator of the network model based on the first-type training set and the second-type training set to obtain an updated network model comprises:
    updating, based on the first-type training set, the parameter of the discriminator according to the second loss function;
    updating, based on the first-type training set, the parameter of the generator according to the first loss function;
    when update times of the parameter of the discriminator and the parameter of the generator reaches a second threshold,
    updating, based on the second-type training set, the parameter of the generator according to the third loss function; and
    updating, based on the second-type training set, the parameter of the discriminator according to the fourth loss function;
    wherein when the update times of the parameter of the discriminator and the parameter of the generator reaches a third threshold, the update times of the network model is increased by 1 until the update times of the network model reaches the first threshold.

5. A processor for executing programs that, when executed by the processor, cause the processor to perform the method for determining the position of the pupil of claim 1.

6. The processor of claim 5, wherein the constructing a loss function of the network model comprises:
    acquiring a hyper-parameter of the network model;
    in response to performing unsupervised learning on the network model, determining the loss function of the network model as a first loss function and a second loss function based on the hyper-parameter; and
    in response to performing supervised learning on the network model, determining the loss function of the network model as a third loss function and a fourth loss function based on the hyper-parameter.

7. The processor of claim 5, wherein the constructing the preset model according to the first-type training set, the second-type training set and the loss function of the network model comprises:
- updating a parameter of a discriminator of the network model and a parameter of a generator of the network model based on the first-type training set and the second-type training set to obtain an updated network model; and
- constructing the preset model according to the updated network model when update times of the network mode reaches a first threshold.

8. The processor of claim 7, wherein the updating a parameter of a discriminator of the network model and a parameter of a generator of the network model based on the first-type training set and the second-type training set to obtain an updated network model comprises:
- updating, based on the first-type training set, the parameter of the discriminator according to the second loss function;
- updating, based on the first-type training set, the parameter of the generator according to the first loss function;
- when update times of the parameter of the discriminator and the parameter of the generator reaches a second threshold,
- updating, based on the second-type training set, the parameter of the generator according to the third loss function; and
- updating, based on the second-type training set, the parameter of the discriminator according to the fourth loss function;
- wherein when the update times of the parameter of the discriminator and the parameter of the generator reaches a third threshold, the update times of the network model is increased by 1 until the update times of the network model reaches the first threshold.

9. An apparatus for determining a position of a pupil, comprising at least one processor and at least one memory for storing a program unit; wherein the program unit is executed by the at least one processor and comprises:
- a first acquisition module, configured to acquire an image to be detected comprising a pupil;
- a second acquisition module, configured to acquire a binary image of a preset area based on a preset model of semi-supervised learning, wherein the preset area is an area where the pupil is located in the image to be detected;
- a third acquisition module, configured to acquire a centroid of the binary image;
- a determination module, configured to determine a central position of the pupil according to the centroid of the binary image;
- a fifth acquisition module, configured to acquire a first-type training set and a second-type training set, wherein the first-type training set and the second-type training set each comprises at least one original image to be trained;
- a sixth acquisition module, configured to acquire a network model, wherein the network model is configured to convert the at least one original image to be trained into the binary image;
- a first construction module, configured to construct a loss function of the network model; and
- a second construction module, configured to construct the preset model according to the first-type training set, the second-type training set and the loss function of the network model.

10. The apparatus of claim 9, wherein the first construction module comprises:
- a seventh acquisition module, configured to acquire a hyper-parameter of the network model;
- a first determination module, configured to determine the loss function of the network model as a first loss function and a second loss function based on the hyper-parameter in response to performing unsupervised learning on the network model; and
- a second determination module, configured to determine the loss function of the network model as a third loss function and a fourth loss function based on the hyper-parameter in response to performing supervised learning on the network model.

11. The apparatus of claim 9, wherein the second construction module comprises:
- a first update module, configured to update a parameter of a discriminator of the network model and a parameter of a generator of the network model based on the first-type training set and the second-type training set to obtain an updated network model; and
- a third construction module, configured to construct the preset model according to the updated network model when update times of the network mode reaches a first threshold.

12. The apparatus of claim 11, wherein the first update module comprises:
- a second update module, configured to update, based on the first-type training set, the parameter of the discriminator according to the second loss function;
- a third update module, configured to update, based on the first-type training set, the parameter of the generator according to the first loss function;
- a fourth update module, configured to update, based on the second-type training set, the parameter of the generator according to the third loss function when update times of the parameter of the discriminator and the parameter of the generator reaches a second threshold; and
- a fifth update module, configured to update, based on the second-type training set, the parameter of the discriminator according to the fourth loss function;
- wherein when the update times of the parameter of the discriminator and the parameter of the generator reaches a third threshold, the update times of the network model is increased by 1 until the update times of the network model reaches the first threshold.

13. A non-transitory storage medium storing programs that, when executed, are used for executing a method for determining a position of a pupil, wherein the method comprises:
- acquiring an image to be detected comprising the pupil;
- acquiring a binary image of a preset area based on a preset model of semi-supervised learning, wherein the preset area is an area where the pupil is located in the image to be detected;
- acquiring a centroid of the binary image;
- determining a central position of the pupil according to the centroid of the binary image;
- wherein before the acquiring a binary image of a preset area based on a preset model of semi-supervised learning, the method further comprises:
- acquiring a first-type training set and a second-type training set, wherein the first-type training set and the second-type training set each comprises at least one original image to be trained;

acquiring a network model, wherein the network model is configured to convert the at least one original image to be trained into the binary image;

constructing a loss function of the network model; and constructing the preset model according to the first-type training set, the second-type training set and the loss function of the network model.

14. The non-transitory storage medium of claim 13, wherein the constructing a loss function of the network model comprises:

acquiring a hyper-parameter of the network model;

in response to performing unsupervised learning on the network model, determining the loss function of the network model as a first loss function and a second loss function based on the hyper-parameter; and in response to performing supervised learning on the network model, determining the loss function of the network model as a third loss function and a fourth loss function based on the hyper-parameter.

15. The non-transitory storage medium of claim 13, wherein the constructing the preset model according to the first-type training set, the second-type training set and the loss function of the network model comprises:

updating a parameter of a discriminator of the network model and a parameter of a generator of the network model based on the first-type training set and the second-type training set to obtain an updated network model; and constructing the preset model according to the updated network model when update times of the network mode reaches a first threshold.

16. The non-transitory storage medium of claim 15, wherein the updating a parameter of a discriminator of the network model and a parameter of a generator of the network model based on the first-type training set and the second-type training set to obtain an updated network model comprises:

updating, based on the first-type training set, the parameter of the discriminator according to the second loss function;

updating, based on the first-type training set, the parameter of the generator according to the first loss function;

when update times of the parameter of the discriminator and the parameter of the generator reaches a second threshold, updating, based on the second-type training set, the parameter of the generator according to the third loss function; and updating, based on the second-type training set, the parameter of the discriminator according to the fourth loss function;

wherein when the update times of the parameter of the discriminator and the parameter of the generator reaches a third threshold, the update times of the network model is increased by 1 until the update times of the network model reaches the first threshold.

* * * * *